(No Model.)
H. C. SPALDING.
ELECTRIC CIRCUIT.
No. 346,510. Patented Aug. 3, 1886.
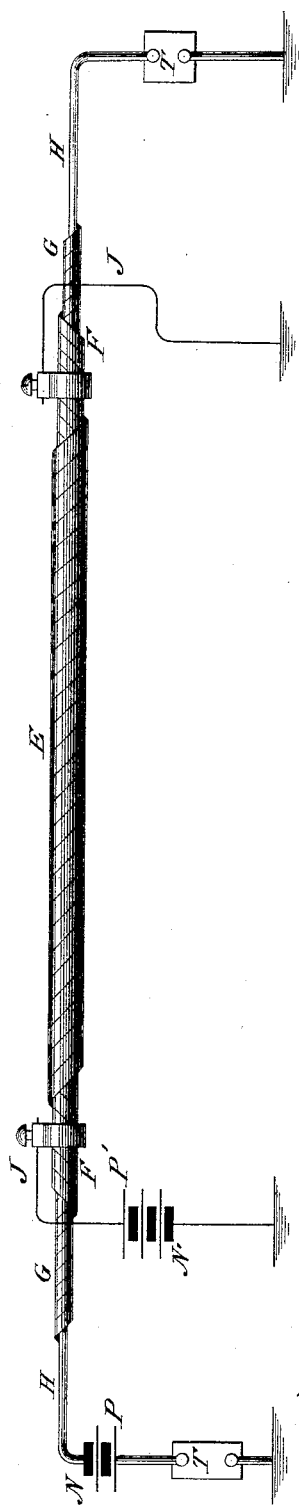
Attest:
Inventor:
Henry C. Spalding

UNITED STATES PATENT OFFICE.

HENRY C. SPALDING, OF BOSTON, MASSACHUSETTS.

ELECTRIC CIRCUIT.

SPECIFICATION forming part of Letters Patent No. 346,510, dated August 3, 1886.

Application filed April 27, 1885. Serial No. 163,656. (No model.)

*To all whom it may concern:*

Be it known that I, HENRY C. SPALDING, a citizen of the United States, residing at Boston, in the county of Suffolk and State of Massachusetts, have invented certain new and useful Improvements in Electric Circuits, of which the following is a specification, reference being had to the drawing accompanying and forming a part of the same.

The object of my present application is an improvement in electric circuits, and is based upon an invention shown and described in an application filed by me April 21, 1884, No. 128,805.

The objects of my invention are, first, to avoid the use of ground-wire or complete metallic circuits for rapid signaling on long underground or submarine lines, thereby reducing the resistance of said circuits; second, to protect these lines from induction and retardation, due to currents in neighboring conductors from static effects and the earth's electricity; third, to facilitate the working of long cables by increasing their capacity for rapid signaling, and, fourth, to obtain stronger and more distinct signals. In the case above referred to I described as the means for accomplishing these results two insulated wires in the same cable or protecting-sheath. Through one of these wires a continuous current is passed, and through the other the intermittent or undulating current by which the signals are transmitted is sent, the direction of this current being opposite to that in the continuous wire, which I term the "idle" wire.

My present invention is an improvement on this in this respect: Instead of using two wires in the same cable, I employ but one wire, and in the protective sheathing or cover I apply a metallic film or layer, which I employ as the idle conductor.

The invention therefore involves a cable containing an insulated central wire or conductor surrounded by an insulated metallic sheath, layer, or cover, the central wire being connected with the line or signaling battery and grounded, and the metallic sheathing being connected with an independent battery and grounded, the connections being so made that the currents in the two conductors flow or pass in opposite directions. The special advantages which this secures are that the diameter of the cable is or may be reduced, the expense lessened, and the effect of the current more complete, for the reason that the continuous current passes in a conductor that entirely surrounds the line-wire.

The invention is illustrated in the drawing, which shows a section of cable with the proper battery and other connections.

H is the central wire or conductor of a cable. G is an insulating coating inclosing the same.

F is a metallic sheathing or layer between the insulating-coating G and an outer insulating and protective coating, E.

The ends of the wire H are grounded in the usual way, and a circuit formed, in which are included signaling-instruments of any kind, designated by the letters T T, and a galvanic battery or other generator of current, P N.

Connections J are made from the ends of the insulated metallic sheath F to the ground, and a circuit thus formed, in which is included a second battery or generator, P' N'. This battery is, however, connected to the circuit including sheathing F in such manner that the current which it causes in the sheathing flows in an opposite direction to that in the wire H from the line-battery P N. The batteries may be placed at either end of the circuit.

The cable may also be constructed in a great many ways, and I do not confine myself to any particular form. In that shown, H is a simple copper wire; G, a spiral wrapping of paper soaked in paraffine, and applied by means of an adhesive insulating compound or varnish. F is a spiral wrapping of tin-foil, and E is any suitable form of insulating and protective coating.

It is well known that such a cable or conductor as I have described possesses, when used, the characteristics of a condenser. For example, a positive current flowing in the conducting-wire produces a state of electrical tension, the sheathing of the cable being negatively electrified. This reacts upon the conductor, which becomes positively electrified by induction. By this means the flow of current is greatly retarded and rapid working interfered with. By my system, however, the current in the metallic sheathing serves to maintain this state of tension both in the outer layer or layers of the cable and also in the central conductor. When signals are sent through the latter, therefore, they are accelerated rather than retarded if the current be in an opposite direction to that in the metal sheathing. For this purpose it is only necessary to use such a battery as will overcome the difference of earth potential, as it would even be possible to transmit signals without any battery in the working line, depending entirely upon the inductive charge from the metallic sheathing. The battery power that would be required for a round-wire circuit is by this means lessened, while the retardation incident to ordinary cables is prevented.

I am aware that cables have been made with an insulated metal sheathing, and that in using these cables it has been proposed to pass a current through the sheathing in the same direction as that of the signaling-current. This, however, is widely different from the nature and object of my invention.

What I claim is—

1. In a system for the transmission of electric signals, the combination, with the conductor of the working-circuit and a generator and signaling-instruments connected therewith, of an insulated metallic sheathing or layer surrounding the said conductor, and a generator for producing a continuous current through the sheathing in an opposite direction to that in the working-circuit, as and for the purpose set forth.

2. In a system for the transmission of electric signals, the combination, with the conductor of the working-circuit, grounded at each end, and a generator and signaling-instruments connected therewith, of an insulated metallic sheathing or layer surrounding the said conductor, connections from the ends of the sheathing to the ground, and a generator connected with the circuit so formed in such a way as to produce therein a continuous current of opposite direction to that in the working-circuit, as set forth.

3. In a system for the transmission of signals, an electric cable composed of two insulated conductors, one central, the other annular about it, in combination with separate batteries for each conductor, said batteries being connected by poles of like sign at opposite ends of the conductors, respectively, the central conductor receiving the intermittent signaling-current and the annular conductor a constant or continuous current, as herein set forth.

HENRY C. SPALDING.

Witnesses:
ALONZO B. WENTWORTH,
JOSEPH T. McDEVETT.